US011665430B2

(12) United States Patent
Shirai

(10) Patent No.: US 11,665,430 B2
(45) Date of Patent: May 30, 2023

(54) IN-VEHICLE DRIVING RECORDER SYSTEM

(71) Applicant: TOYOTA JIDOSHA KABUSHIKI KAISHA, Toyota (JP)

(72) Inventor: Ryo Shirai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/729,066

(22) Filed: Apr. 26, 2022

(65) Prior Publication Data

US 2022/0360719 A1    Nov. 10, 2022

(30) Foreign Application Priority Data

May 6, 2021 (JP) .............................. JP2021-078798

(51) Int. Cl.
  *B60R 1/074* (2006.01)
  *H04N 23/695* (2023.01)
  *B60R 1/12* (2006.01)
  *G06T 7/20* (2017.01)
  *H04N 23/90* (2023.01)

(52) U.S. Cl.
  CPC ........... *H04N 23/695* (2023.01); *B60R 1/074* (2013.01); *B60R 1/12* (2013.01); *G06T 7/20* (2013.01); *H04N 23/90* (2023.01); *B60R 2001/1253* (2013.01); *G06T 2207/30252* (2013.01)

(58) Field of Classification Search
  CPC . B60R 1/00; B60R 2300/607; B60R 2300/70; B60R 1/27; B60R 2300/105; B60R 2300/806; B60R 11/04; B60R 2011/0026; B60R 2300/10; B60R 2300/20

USPC .......................................................... 348/148
See application file for complete search history.

(56) References Cited

U.S. PATENT DOCUMENTS

| | | | | |
|---|---|---|---|---|
| 7,161,616 | B1* | 1/2007 | Okamoto | B60R 1/00 348/E7.086 |
| 2008/0119993 | A1* | 5/2008 | Breed | G08G 1/166 701/45 |
| 2009/0143967 | A1* | 6/2009 | Lee | B60R 1/00 701/119 |
| 2010/0194596 | A1* | 8/2010 | Wang | B60R 1/00 340/936 |
| 2012/0140072 | A1* | 6/2012 | Murashita | G06V 20/58 348/148 |
| 2015/0109446 | A1* | 4/2015 | Takano | B60R 25/10 348/148 |
| 2016/0191795 | A1* | 6/2016 | Han | G06V 20/56 348/36 |

(Continued)

FOREIGN PATENT DOCUMENTS

JP    2015-088794 A    5/2015

*Primary Examiner* — Masum Billah
(74) *Attorney, Agent, or Firm* — Sughrue Mion, PLLC

(57) ABSTRACT

In a state in which a side mirror of a vehicle is disposed at a closed position, an image capture deficiency range of the periphery of the vehicle cannot be imaged. The side mirror is rotated from the closed position to an open position when, in the state in which the side mirror is disposed at the closed position, a controller determines that a nearby object that is proximate to the vehicle is entering the image capture deficiency range. The controller makes this determination when the nearby object is not located in an imaging range according to the imaging section but is located in a detection range according to a clearance sonar.

18 Claims, 17 Drawing Sheets

(56) References Cited

U.S. PATENT DOCUMENTS

| | | | | |
|---|---|---|---|---|
| 2017/0161902 | A1* | 6/2017 | Patil | B60Q 9/00 |
| 2017/0297488 | A1* | 10/2017 | Wang | G06T 5/006 |
| 2018/0267558 | A1* | 9/2018 | Tiwari | H04N 13/243 |
| 2020/0156592 | A1* | 5/2020 | Zaharia | B60R 1/00 |
| 2020/0314333 | A1* | 10/2020 | Liang | H04N 7/181 |
| 2021/0109543 | A1* | 4/2021 | Hiromitsu | G06V 20/58 |

* cited by examiner

IN-VEHICLE DRIVING RECORDER SYSTEM

CROSS-REFERENCE TO RELATED APPLICATION

This application is based on and claims priority under 35 USC § 119 from Japanese Patent Application No. 2021-078798 filed on May 6, 2021, the disclosure of which is incorporated by reference herein.

TECHNICAL FIELD

The present disclosure relates to an in-vehicle driving recorder system.

RELATED ART

Japanese Patent Application Laid-Open (JP-A) No. 2015-088794 (Patent Reference 1) recites a vehicle periphery video image recording system that includes: a camera that is mounted at the vehicle and images the periphery of the vehicle; a memory section that memorizes video images captured by the camera; and a sonar that detects obstacles at the periphery of the vehicle. In this technology, a radar ECU continuously detects vehicle periphery conditions by sonar, determines whether or not a change has occurred in the vehicle periphery conditions and, in accordance with a determination that the vehicle periphery conditions have changed, outputs a recording start signal. In accordance with receiving the recording start signal, a black box computer causes the camera to image the periphery of the vehicle and records video images captured by the camera at the memory section.

There is increasing need for a side camera mounted at a side mirror to expand objects of imaging by the side camera to include objects with tallness. To meet this need, it is necessary to angle an optical axis of the side camera to the vehicle outer side from the vertical direction. In this case, when the side camera has been stowed (rotated from an open position to a closed position), an imaging range of the side camera is reduced and a gap occurs in the imaging range.

SUMMARY

The present disclosure is made in consideration of the circumstances described above, and an object of the present disclosure is to provide an in-vehicle driving recorder system that may, in a structure in which an optical axis of a side camera mounted at a side mirror is angled to a vehicle outer side from the vertical direction, image a nearby object that is proximate to the vehicle even when the side mirror has been disposed at a closed position.

An in-vehicle driving recorder system according to a first aspect includes: an imaging section that includes left and right side cameras mounted at side mirrors that are provided at each of left and right of a vehicle, each side mirror being rotatable between an open position and a closed position, and an optical axis of each side camera being angled outward from the vehicle relative to the vertical direction in a state in which the side mirror is disposed at the open position, a front camera that images to the front of the vehicle, and a rear camera that images to the rear of the vehicle; a detector that transmits a probing wave, receives a reception wave including a reflection of the probing wave, and detects an object located in surroundings of the vehicle; a recording section that records images imaged by the imaging section; and a controller that causes the each side mirror to rotate from the closed position toward the open position when the controller determines that a nearby object proximate to the vehicle is entering an image capture deficiency range of a periphery of the vehicle, the imaging section being incapable of imaging the image capture deficiency range in the state in which the side mirror is disposed at the closed position, and the controller making the determination on the basis of at least one of imaging results from the imaging section and detection results from the detector.

In the first aspect, each side camera is mounted at a side mirror. In a state in which the side mirror is disposed at the open position, the optical axis of the side camera is angled outward from the vehicle relative to the vertical direction. Therefore, in a state in which the side mirror has been rotated to the closed position, an imaging range of the side camera is narrower, causing the image capture deficiency range of the periphery of the vehicle, which range can not be imaged by the imaging section. Accordingly, in the first aspect, when a determination based on one or both of imaging results of the imaging section and detection results of the detector is that a nearby object is entering the image capture deficiency range, the side mirror is rotated from the closed position toward the open position. Therefore, a case of the nearby object leaving an imaging range may be prevented and imaging of the nearby object may continue.

Thus, according to the first aspect, in the structure in which the optical axis of the side camera is angled to the vehicle outer side from the vertical direction, a nearby object that is proximate to the vehicle may be imaged even when the side mirror has been disposed at the closed position. Furthermore, because the side mirror is rotated only when a determination is made that the nearby object is entering the image capture deficiency range, a number of times the side mirror is rotated may be reduced compared to a structure in which the side mirror is rotated when a nearby object first appears. Thus, energy consumption may be reduced.

In a second aspect, in the first aspect, in the state in which the side mirror is disposed at the closed position, the controller determines that the nearby object is entering the image capture deficiency range when the nearby object is not located in an imaging range according to the imaging section but the nearby object is located in a detection range according to the detector.

According to the second aspect, when the nearby object is not located in the imaging range according to the imaging section, the determination as to whether a nearby object is entering the image capture deficiency range may be realized by simple processing.

In a third aspect, in the first aspect or the second aspect, in the state in which the side mirror is disposed at the closed position, the controller determines that the nearby object is entering the image capture deficiency range when the nearby object is located in an imaging range according to the imaging section and the controller detects a movement of the nearby object to leave the imaging range.

According to the third aspect, when a nearby object is located in the imaging range according to the imaging section, the determination as to whether the nearby object is entering the image capture deficiency range may be realized by simple processing.

In a fourth aspect, in the third aspect, in the state in which the side mirror is disposed at the closed position, the controller maintains the state in which the side mirror is disposed at the closed position when the nearby object is located in the imaging range according to the imaging section and the controller does not detect a movement of the nearby object to leave the imaging range.

According to the fourth aspect, a number of times the side mirror is rotated may be reduced and energy consumption may be reduced.

In a fifth aspect, in any of the first to fourth aspects, in the state in which the side mirror is disposed at the closed position, the controller maintains the state in which the side mirror is disposed at the closed position when the nearby object is not located in an imaging range according to the imaging section and the nearby object is not located in a detection range according to the detector.

According to the fifth aspect, a number of times the side mirror is rotated may be reduced and energy consumption may be reduced.

In a sixth aspect, in any of the first to fifth aspects, when the side mirror has been rotated from the closed position to the open position and subsequently the controller detects that the nearby object is moving away from the vehicle and departing to outside an imaging range according to the imaging section, the controller causes the side mirror to rotate from the open position to the closed position.

According to the sixth aspect, the side mirror may be returned to the closed position when a nearby object departs to outside the imaging range according to the imaging section.

In a seventh aspect, in any of the first to sixth aspects, a detection range of the detector is a range that encompasses the image capture deficiency range.

According to the seventh aspect, when a nearby object approaches the vehicle from a direction in the image capture deficiency range, the nearby object may be detected by the detector.

Advantageous Effects of Invention

The present disclosure enables, in a structure in which an optical axis of a side camera mounted at a side mirror is angled to a vehicle outer side from a vertical direction, imaging of a nearby object proximate to the vehicle even when the side mirror has been disposed at the closed position.

BRIEF DESCRIPTION OF DRAWINGS

FIG. 4 is disposed at the open position.

FIG. 4 is disposed at the closed position.

FIG. 15 is disposed at an open position.

FIG. 15 is disposed at a closed position.

DESCRIPTION OF EMBODIMENTS

Figure 1:
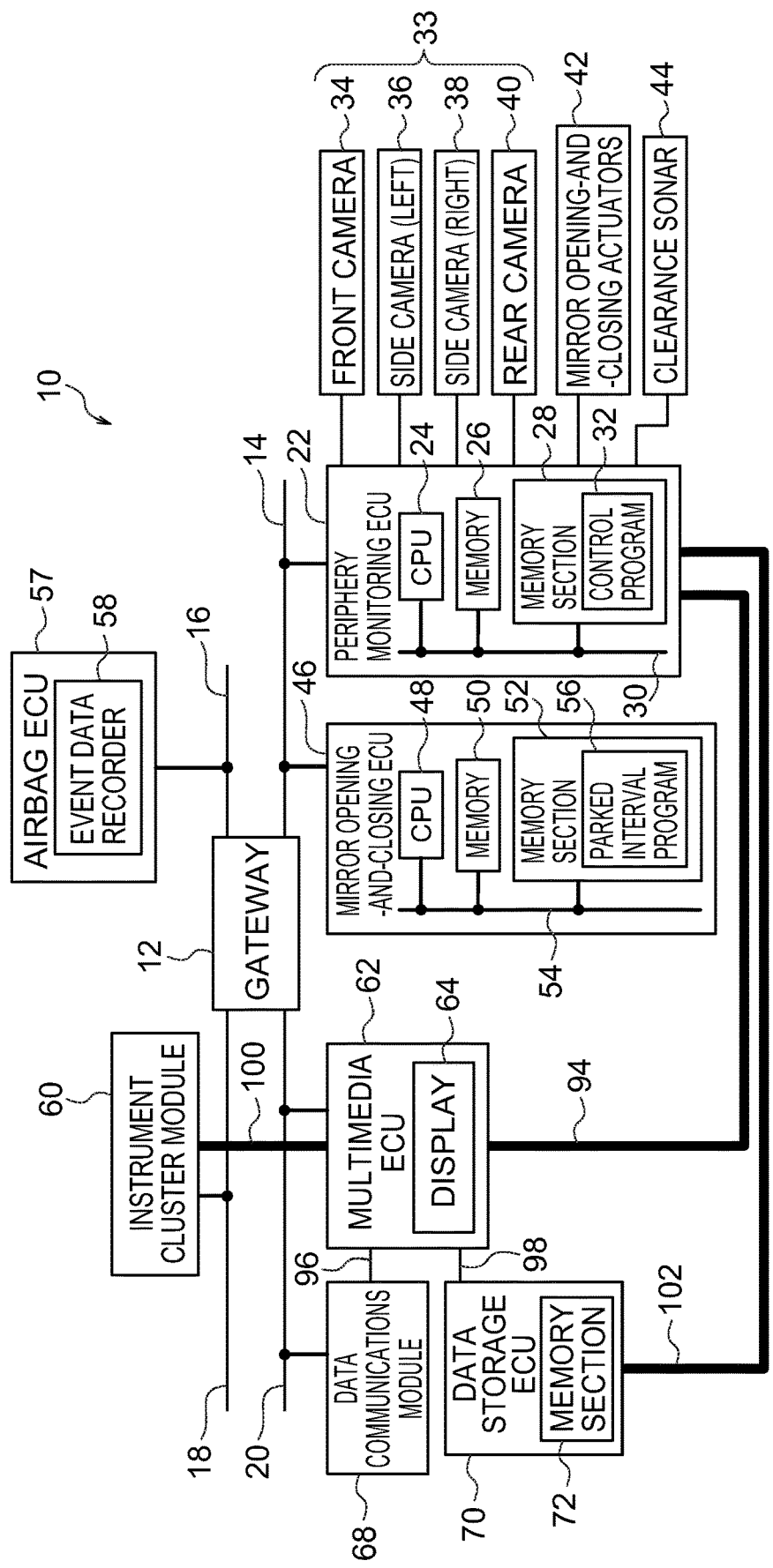
FIG. 1 is a block diagram showing a schematic configuration of an in-vehicle system according to an exemplary embodiment.

Below, an example of an embodiment of the present disclosure is described in detail with reference to the drawings. An in-vehicle system 10 according to the present exemplary embodiment is shown in FIG. 1. The in-vehicle system 10 includes a gateway 12, a first bus 14, a second bus 16, a third bus 18 and a fourth bus 20. One end of each bus is connected to the gateway 12.

A periphery monitoring ECU 22 and a mirror opening-and-closing ECU 46 are each connected to the first bus 14. An airbag ECU 57 including an event data recorder (EDR) 58 is connected to the second bus 16. An instrument cluster module 60 is connected to the third bus 18. A multimedia ECU 62 and a data communications module 68 are each connected to the fourth bus 20.

Figure 2:
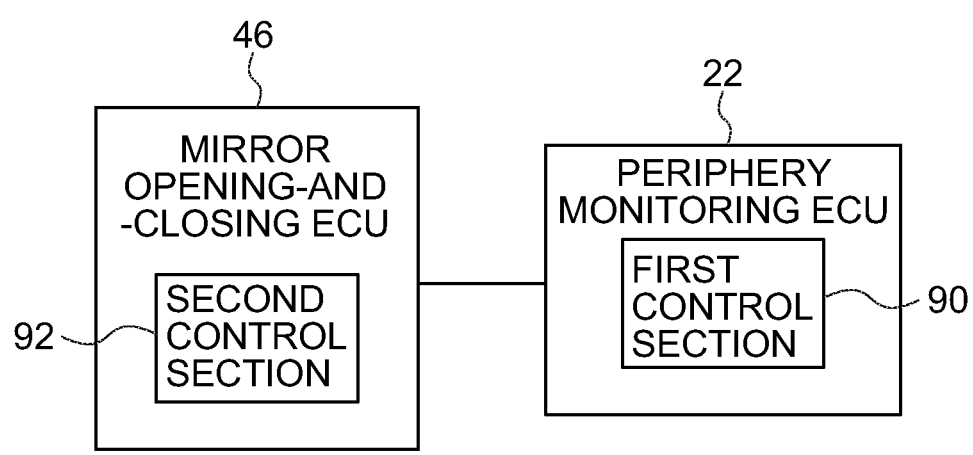
FIG. 2 is a functional block diagram of a periphery monitoring ECU and a mirror opening-and-closing ECU.

The periphery monitoring ECU 22 includes a central processing unit (CPU) 24, a memory 26 with read-only memory (ROM) and random access memory (RAM) or the like, and a non-volatile memory section 28 with a hard disk drive (HDD), solid state drive (SSD) or the like. The CPU 24, memory 26 and memory section 28 are connected to be capable of communicating with one another via an internal bus 30. The memory section 28 of the periphery monitoring ECU 22 memorizes a control program 32. The periphery monitoring ECU 22 reads the control program 32 from the memory section 28 and loads the control program 32 into the memory 26. The control program 32 loaded into the memory 26 is executed by the CPU 24. Thus, the periphery monitoring ECU 22 functions as a first control section 90 shown in FIG. 2.

The periphery monitoring ECU 22 is connected with a front camera 34 provided at a vicinity of a front end portion of a vehicle 76 (see FIG. 5 and FIG. 6), side cameras 36 and 38 mounted at, respectively, left and right side mirrors 78 (see FIG. 3) of the vehicle, and a rear camera 40 provided at a vicinity of a rear end portion of the vehicle. The front camera 34, side cameras 36 and 38, and rear camera 40 are an example of an imaging section of the present disclosure, and are referred to where required as an imaging section 33. The imaging section 33 is an example of the imaging section of the present disclosure.

Figure 3:
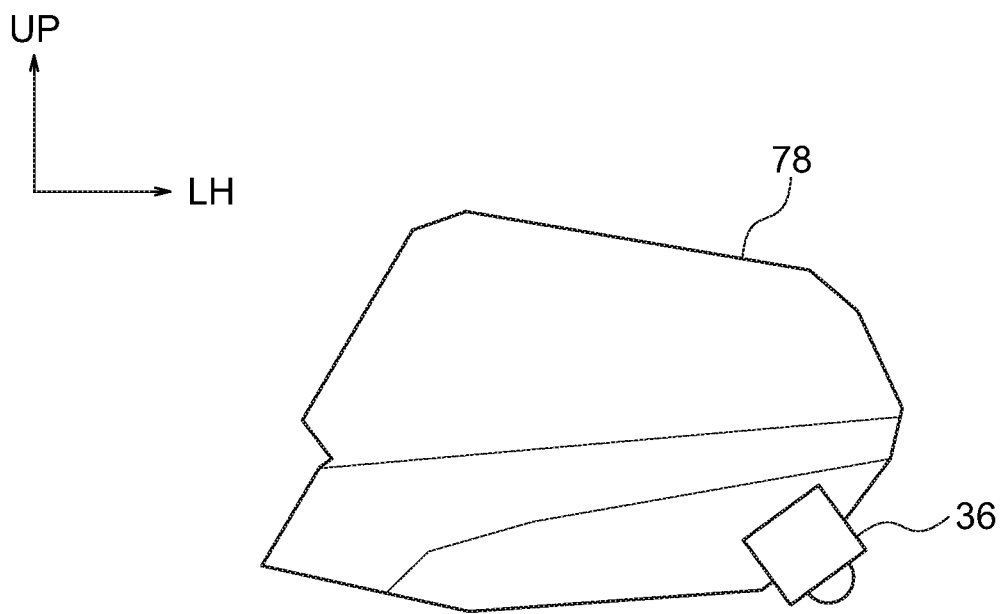
FIG. 3 is a front view of a side mirror according to the exemplary embodiment in which a side camera is mounted with an optical axis thereof angled from the vertical direction.
Figure 4:
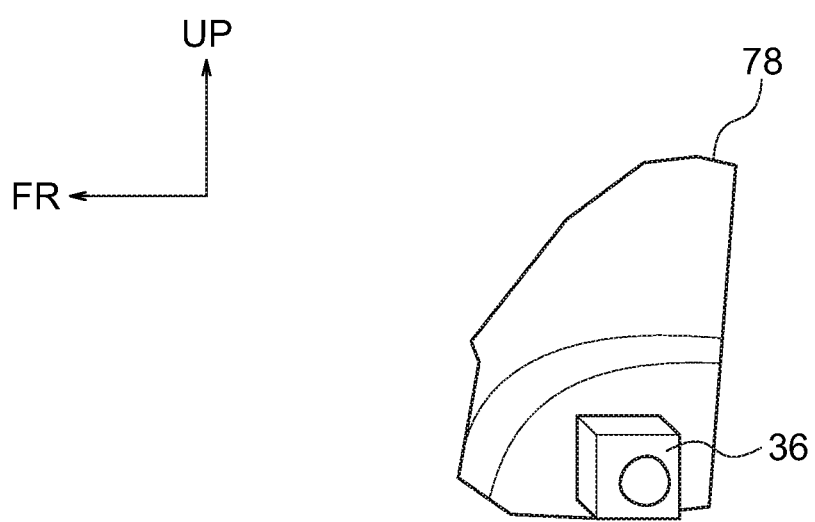
FIG. 4 is a side view of the side mirror according to the exemplary embodiment in which the side camera is mounted with the optical axis thereof angled from the vertical direction.
Figure 5:
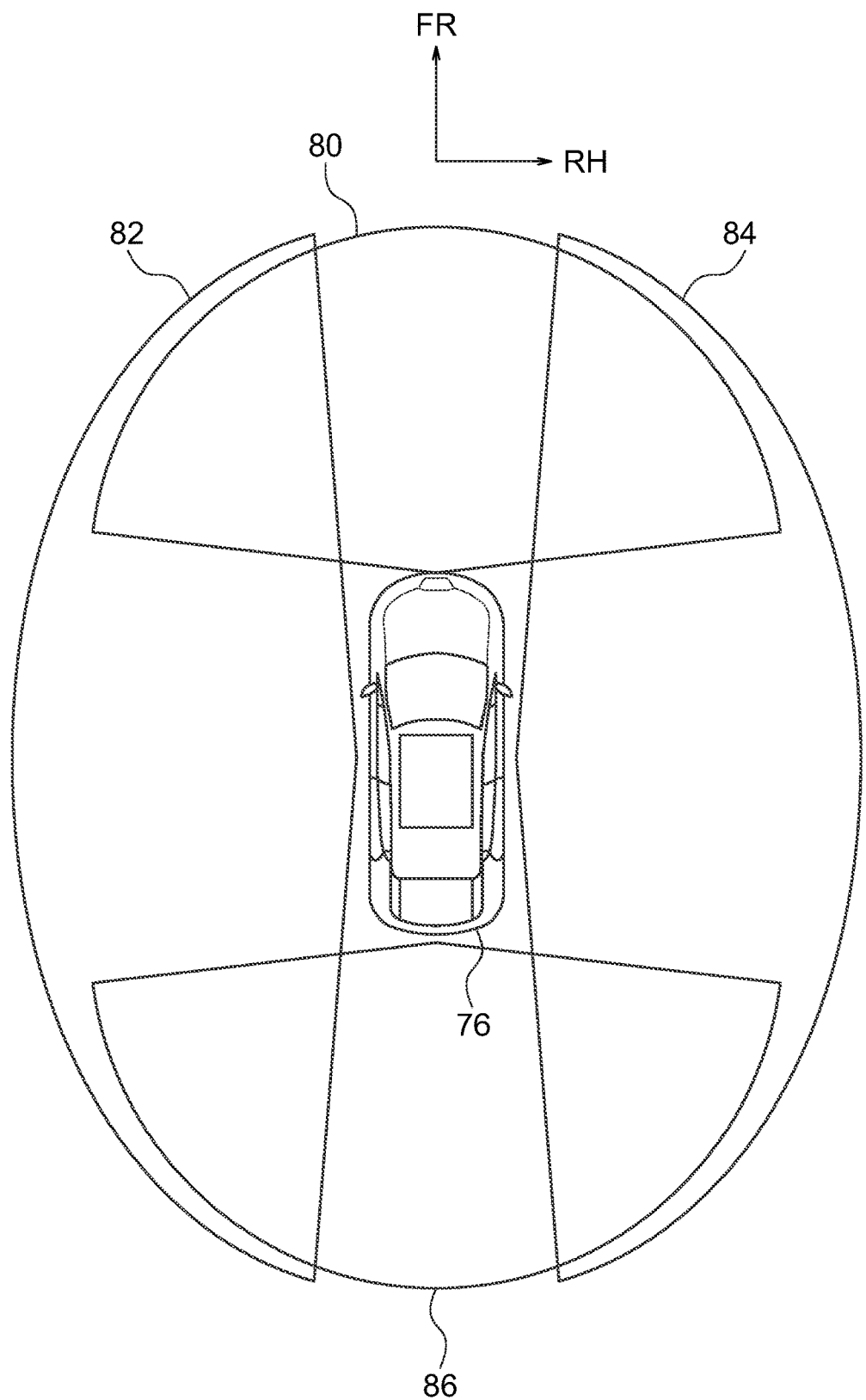
FIG. 5 is a conceptual diagram showing an imaging range of an imaging section when side mirrors are disposed at open positions.

As shown in FIG. 3 and FIG. 4, the optical axis of each of the side cameras 36 and 38 is angled toward the vehicle 76 outer side from the vertical direction, in order to expand objects of imaging by the side camera to include objects with tallness. When the side mirrors 78 are disposed at open positions thereof, as shown in FIG. 5, an imaging range according to the imaging section 33 (the front camera 34, the side cameras 36 and 38, and the rear camera 40) covers the whole circumference (360°) around an axis of the vehicle in the vertical direction. In FIG. 5 (and FIG. 6), the reference symbol 80 indicates an imaging range of the front camera 34, the reference symbol 82 indicates an imaging range of the side camera 36, the reference symbol 84 indicates an imaging range of the side camera 38, and the reference symbol 86 indicates an imaging range of the rear camera 40.

Figure 6:
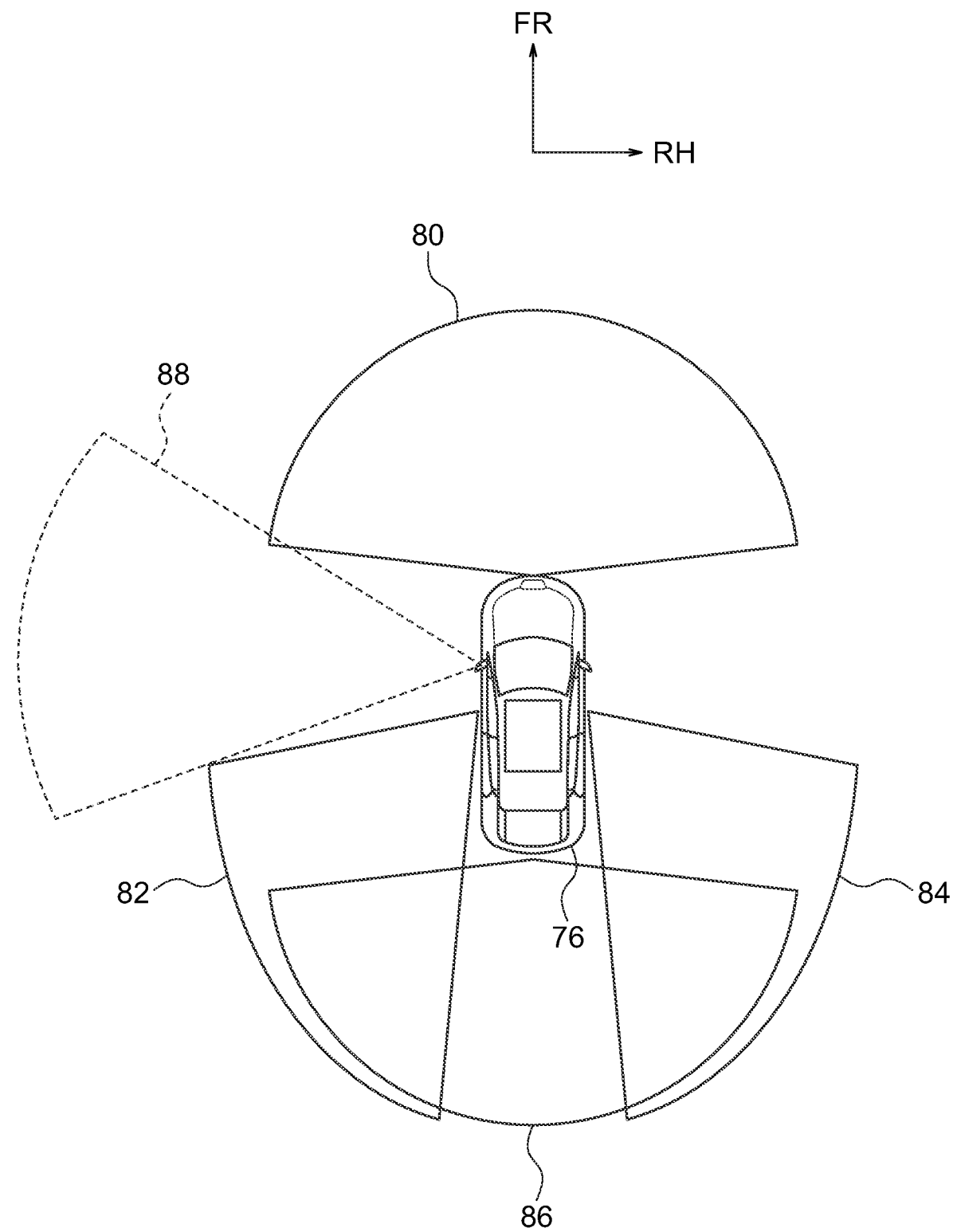
FIG. 6 is a conceptual diagram showing an imaging range of the imaging section when the side mirrors are disposed at closed positions.

In contrast, when the side mirrors 78 are disposed at closed positions thereof, because the optical axes of the side cameras 36 and 38 are angled, a partial range of the circumference around the axis of the vehicle in the vertical direction becomes an image capture deficiency range 88 that cannot be imaged by the imaging section 33, as illustrated in FIG. 6. The image capture deficiency range 88 is shown only at the left side of the vehicle 76 in FIG. 6, but actually the image capture deficiency range 88 that cannot be imaged by the imaging section 33 is also present at the right side of the vehicle 76.

During running while an ignition switch of the vehicle 76 is turned on and during parking while the ignition switch of the vehicle 76 is turned off, the first control section 90 controls operations of the imaging section 33 such that the surroundings of the vehicle 76 are imaged by the imaging section 33. While the vehicle 76 is parked, the first control section 90 makes determinations based on images captured by the imaging section 33 as to whether a nearby object that is proximate to the vehicle 76 is located in the imaging range according to the imaging section 33. Nearby objects may include nearby people and objects with a high possibility of collision. When the first control section 90 determines that a nearby object is located in the imaging range according to the imaging section 33, the first control section 90 detects a direction of movement (a vector) of the nearby object.

The periphery monitoring ECU 22 is connected to mirror opening-and-closing actuators 42 that rotate the side mirrors 78 to the open positions or closed positions. The first control section 90 causes the mirror opening-and-closing actuators 42 to rotate the side mirrors 78 to the open positions or closed positions in accordance with commands from a second control section 92 of the mirror opening-and-closing ECU 46, which is described below.

The periphery monitoring ECU 22 is also connected to a clearance sonar 44. The clearance sonar 44 includes plural ultrasonic sensors that are respectively provided at plural locations of the circumference of the vehicle 76. Each ultrasonic sensor transmits ultrasonic waves that serve as probing waves and receives reception waves including reflections of the probing waves. Thus, the ultrasonic sensor detects a position (a distance and direction) of an object located in the surroundings of the vehicle 76. A detection range according to the clearance sonar 44 covers the whole circumference (360°) around the axis of the vehicle in the vertical direction, regardless of whether the side mirrors 78 are disposed at the closed positions or the open positions. The clearance sonar 44 is an example of a detector of the present disclosure.

The first control section 90 controls operations of the clearance sonar 44 such that objects located in the surroundings of the vehicle 76 are detected by the clearance sonar 44. Times at which the clearance sonar 44 is operated may include times of parking operations when driving operations are performed to park the vehicle 76, times during parking while the ignition switch of the vehicle 76 is turned off, and so forth. Object detection results according to the clearance sonar 44 at times of parking operations are used for outputting warnings as required and for the first control section 90 rather than a driver to perform brake control interventions to brake or decelerate the vehicle.

While the vehicle 76 is parked, on the basis of object detection results according to the clearance sonar 44, the first control section 90 makes determinations as to whether or not a nearby object proximate to the vehicle 76 is present in the detection range of the clearance sonar 44. When the first control section 90 determines that a nearby object is present in the detection range of the clearance sonar 44, the first control section 90 detects a direction of movement (a vector) of the nearby object.

The mirror opening-and-closing ECU 46 includes a CPU 48, a memory 50 with ROM, RAM and the like, and a non-volatile memory section 52 with an HDD, SSD or the like. The CPU 48, memory 50 and memory section 52 are connected to be capable of communicating with one another via an internal bus 54. The memory section 52 of the mirror opening-and-closing ECU 46 memorizes a parked interval program 56. The mirror opening-and-closing ECU 46 reads the parked interval program 56 from the memory section 52 and loads the parked interval program 56 into the memory 50, and the parked interval program 56 loaded into the memory 50 is executed by the CPU 48. Thus, the mirror opening-and-closing ECU 46 functions as the second control section 92 shown in FIG. 2 and carries out parked interval processing, which is described below. The second control section 92 operates in co-operation with the first control section 90 to function as an example of a controller of the present disclosure.

When the second control section 92 determines, on the basis of one or both of imaging results according to the imaging section 33 and object detection results according to the clearance sonar 44, that a nearby object is entering the image capture deficiency range 88, the second control section 92 rotates the side mirrors 78 from the closed positions to the open positions.

The multimedia ECU 62 includes a display 64 and is connected with the periphery monitoring ECU 22 via a communication line 94 that conducts communications in conformance with a standard such as, for example, Low Voltage Differential Signaling (LVDS) or the like. The multimedia ECU 62 is connected with the data communications module 68 and a data storage ECU 70 via communication lines 96 and 98 that conduct communications in conformance with a standard such as, for example, Universal Serial Bus (USB) or the like. The multimedia ECU 62 is connected with the instrument cluster module 60 via a communication line 100.

The multimedia ECU 62 acquires images captured by the imaging section 33 from the periphery monitoring ECU 22 via the communication line 94, processes the acquired images, and displays images at the display 64 or the instrument cluster module 60. For example, during parking operations, the multimedia ECU 62 processes images captured by the imaging section 33 into an image with a viewpoint looking downward from above the vehicle 76 (below referred to as a bird's eye image) and displays this image at the display 64.

The data storage ECU 70 is equipped with a non-volatile memory section 72 and is connected with the periphery monitoring ECU 22 via a communication line 102 that conducts communications in conformance with a standard such as, for example, LVDS or the like. The data storage ECU 70 acquires images captured by the imaging section 33 from the periphery monitoring ECU 22 via the communication line 102, and records the acquired images at the memory section 72. The data storage ECU 70 is an example of a recording section of the present disclosure.

The imaging section 33, clearance sonar 44, data storage ECU 70, periphery monitoring ECU 22 (the first control section 90) and mirror opening-and-closing ECU 46 (the second control section 92) according to the present exemplary embodiment are an example of the in-vehicle driving recorder system relating to the present disclosure.

Now, operation of the present exemplary embodiment is described. Conventionally, the main application of images captured by the imaging section 33 would be to assist parking operations by processing the images into a bird's eye image and displaying the bird's eye image at the display 64. The principal information that needs to be shown in a bird's eye view when assisting driving operations is white lines on the road surface, kerb stones, the presence or absence of vehicles parked in adjacent parking spaces, and the like. Thus, objects that are objects of imaging are all low in height.

Figure 14:
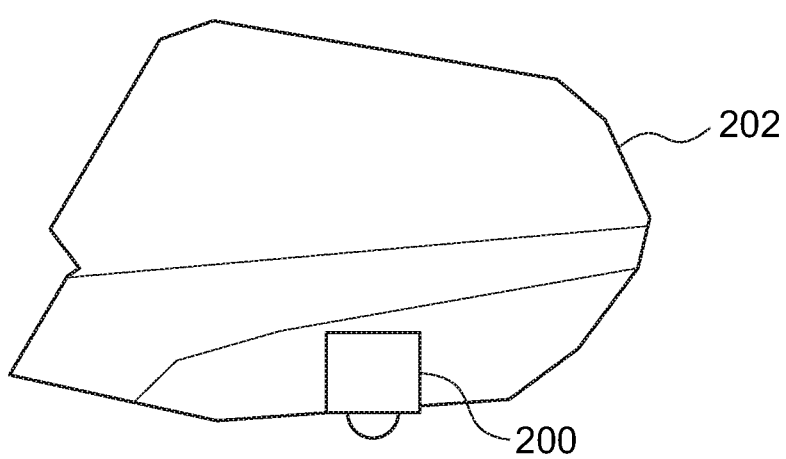
FIG. 14 is a front view of a conventional side mirror at which a side camera is mounted such that an optical axis thereof is in line with the vertical direction.
Figure 15:
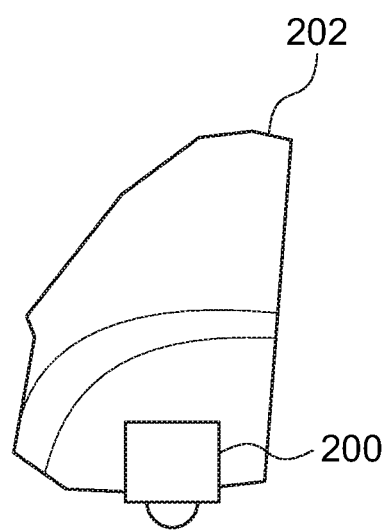
FIG. 15 is a side view of the conventional side mirror at which the side camera is mounted such that the optical axis is in line with the vertical direction.
Figure 16:
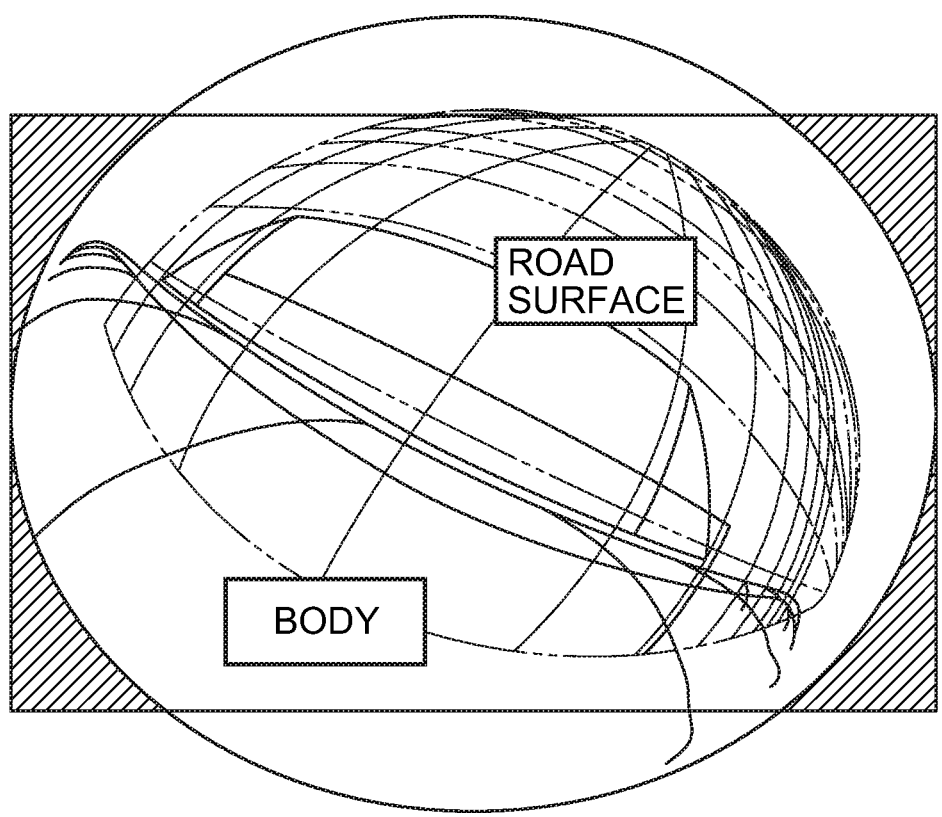
FIG. 16 is a conceptual diagram showing a range that can be imaged by the side camera when the side mirror illustrated in FIG. 14
Figure 17:
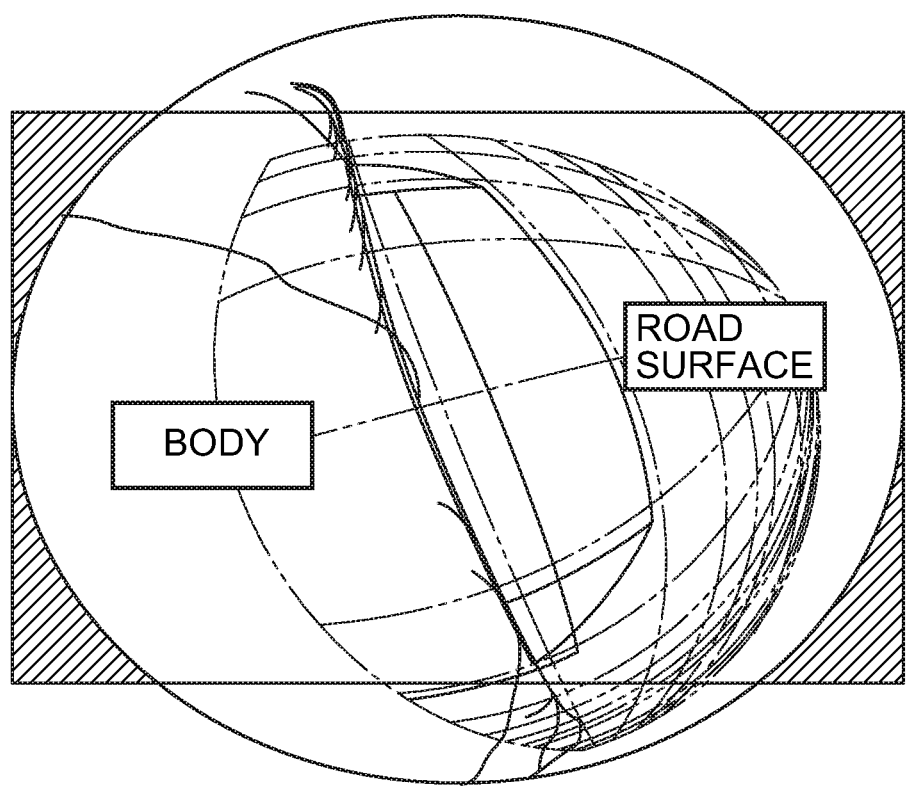
FIG. 17 is a conceptual diagram showing a range that can be imaged by the side camera when the side mirror illustrated in FIG. 14

Therefore, for example, as shown in FIG. 14 and FIG. 15, a conventional side camera 200 is mounted at a side mirror 202 such that an optical axis of the side camera 200 is in line with the vertical direction. Ranges that may be imaged by the side camera 200 are shown in FIG. 16 and FIG. 17. As can be seen in FIG. 16 and FIG. 17, when the side camera 200 is mounted at the side mirror 202 such that the optical axis is in line with the vertical direction, because the optical axis of the side camera 200 is in line with the vertical direction regardless of the side mirror 202 opening or closing, a large area of the road surface in the surroundings of the vehicle may be visible.

However, when the use of images captured by the imaging section 33 for autonomous parking, autonomous driving or the like is examined, height information of the surroundings that is obtained by imaging with the conventional side camera whose imaging optical axis is in line with the vertical direction is insufficient. Accordingly, it is becoming increasingly common for the optical axis of the side camera 36 (and the side camera 38) mounted at the side mirror 78 to be angled to the vehicle 76 outer side from the vertical direction, as shown in FIG. 3 and FIG. 4. As a result, more height information on the surroundings is obtained by imaging than conventionally, and captured images may be utilized for recognition of the surroundings.

Figure 7:
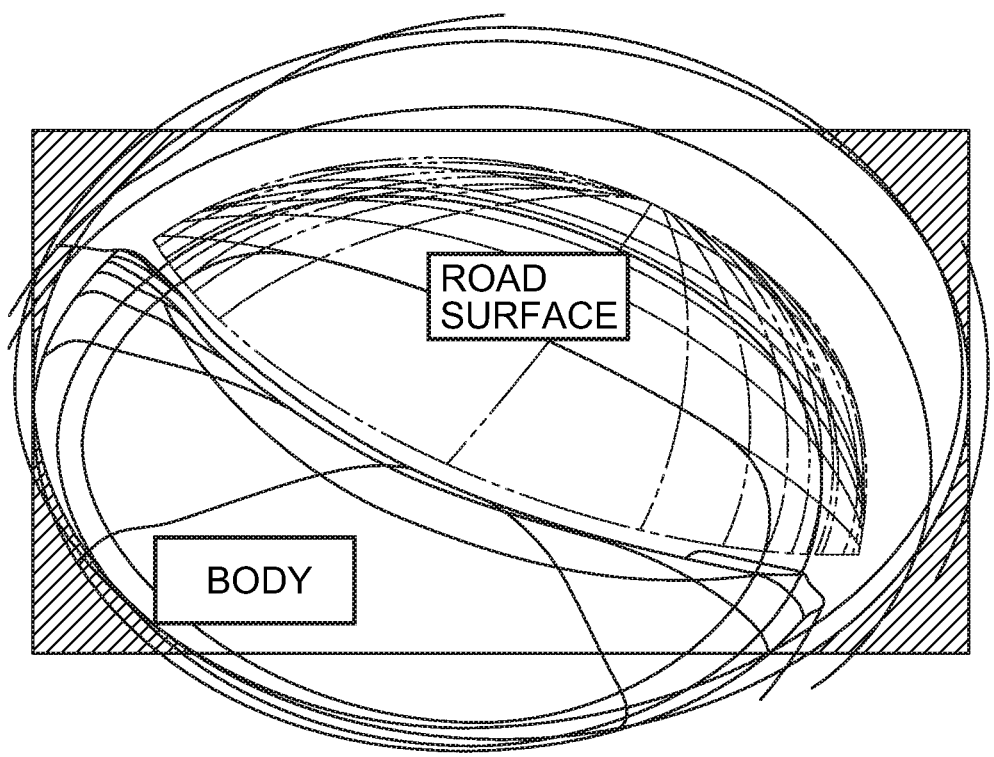
FIG. 7 is a conceptual diagram showing a range that can be imaged by the side camera when the side mirror illustrated in FIG. 3
Figure 8:
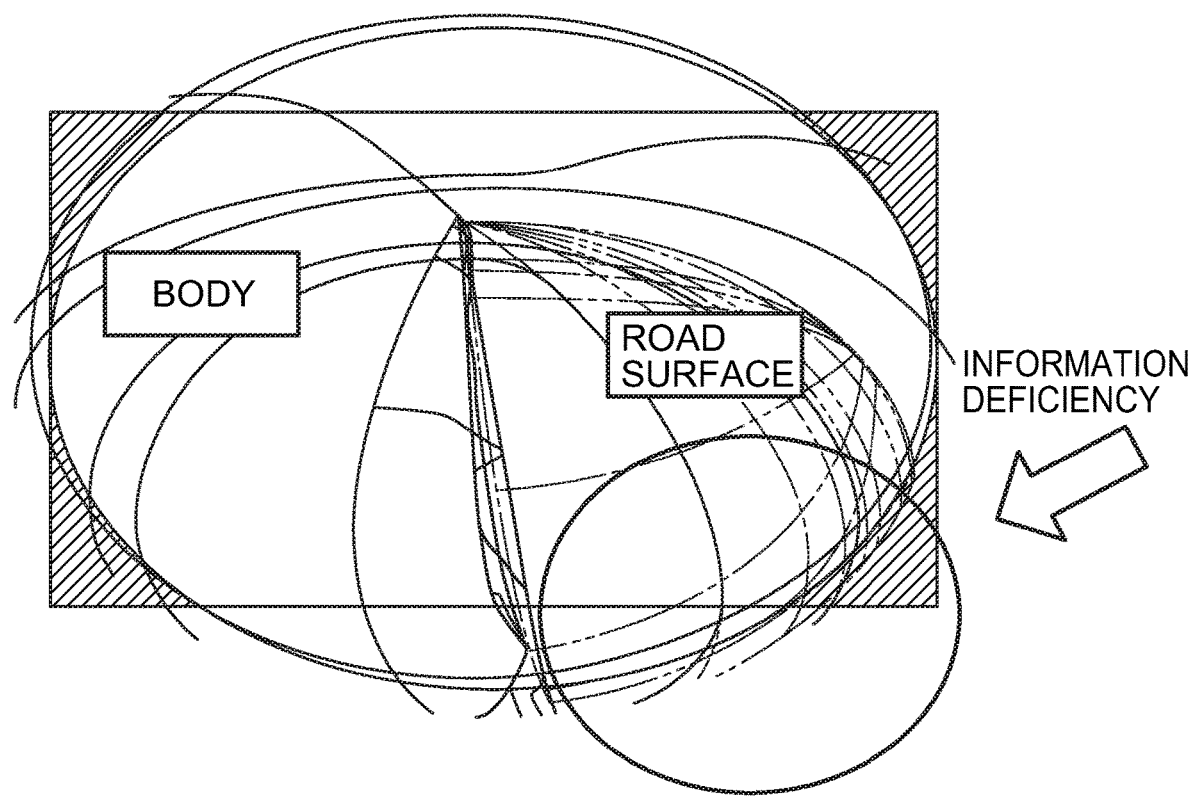
FIG. 8 is a conceptual diagram showing a range that can be imaged by the side camera when the side mirror illustrated in FIG. 3

When the optical axes of the side cameras 36 and 38 mounted at the side mirrors 78 are angled to the vehicle 76 outer sides from the vertical direction, the optical axis of the side camera 36 is directed to rearward when the side mirror 78 is rotated to the closed position. Thus, the imaging ranges of the side cameras 36 and 38 are reduced. As a result, as can be seen by comparing FIG. 8 with FIG. 7, a gap occurs in the imaging range at a front-left side face of the vehicle (and at a front-right side face).

It is usual for the side mirrors 78 to be folded (rotated to the closed positions) while the vehicle is parked. Accordingly, when images captured by the imaging section 33 while the vehicle is parked are to be recorded as driving recorder images, then when a nearby object is present in the surroundings, rotating the side mirrors 78 to the open positions can be considered. However, if the side mirrors 78 are opened and closed frequently, energy consumption increases and energy that is available for recording images is reduced.

Figure 9:
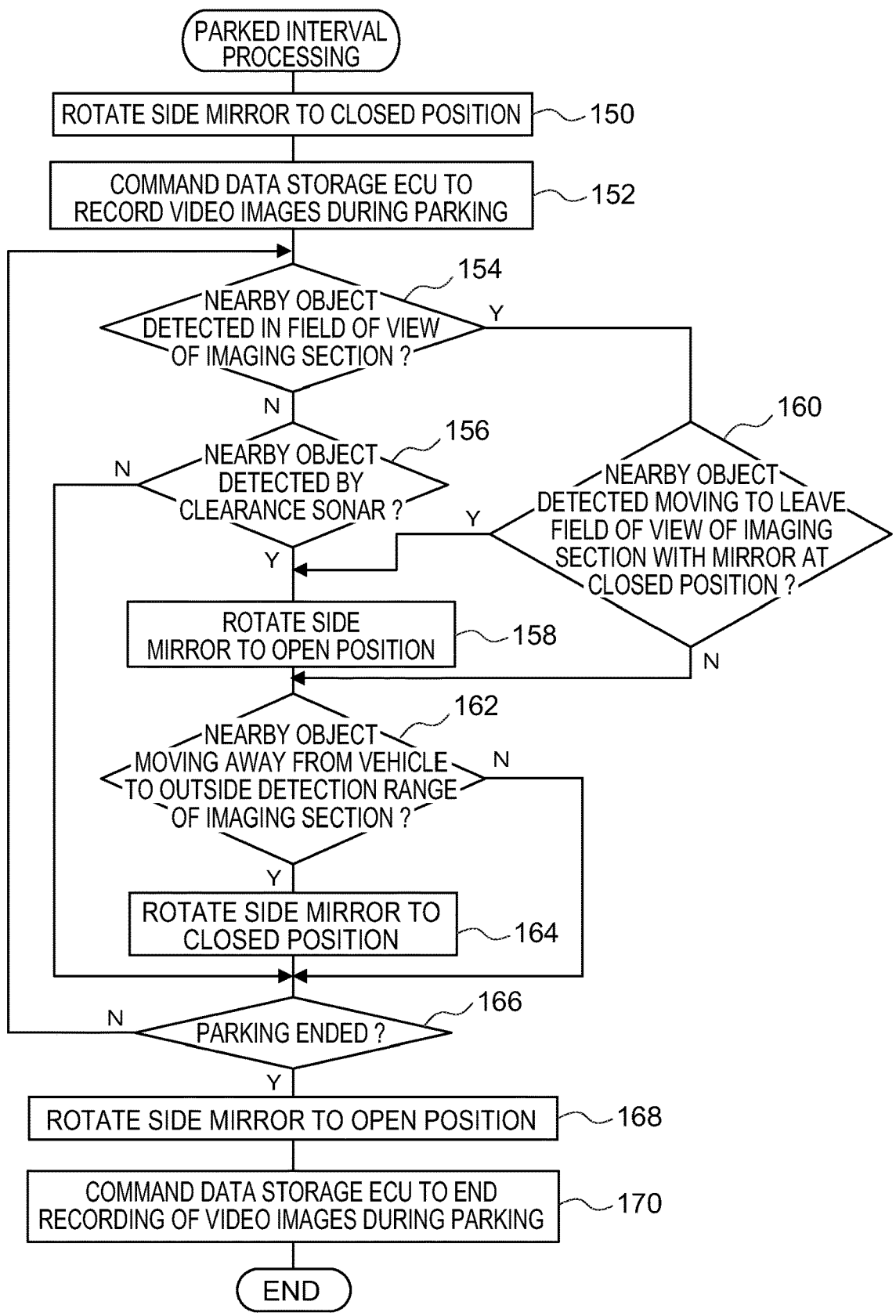
FIG. 9 is a flowchart showing parked interval processing that is executed by the mirror opening-and-closing ECU.

In accordance with the above descriptions, the second control section 92 of the mirror opening-and-closing ECU 46 carries out the parked interval processing shown in FIG. 9 while the vehicle 76 is parked. In step 150 of the parked interval processing, the second control section 92, via the first control section 90 of the periphery monitoring ECU 22, causes the mirror opening-and-closing actuators 42 to rotate the side mirrors 78 to the closed positions.

In step 152, the second control section 92 commands the data storage ECU 70 to record video images in the parked interval. Accordingly, the data storage ECU 70 starts processing to acquire images (moving images) captured by the imaging section 33 via the communication line 102 and record the acquired images at the memory section 72 as parked interval driving recorder images.

In step 154, the second control section 92 acquires nearby object detection results based on images captured by the imaging section 33 from the first control section 90, and the second control section 92 makes a determination as to whether the first control section 90 has detected a nearby object in the current imaging range of the imaging section 33. When the result of the determination in step 154 is negative, the second control section 92 proceeds to step 156.

In step 156, the second control section 92 acquires nearby object detection results based on detection results according to the clearance sonar 44 from the first control section 90, and the second control section 92 makes a determination as to whether the first control section 90 has detected a nearby object. When the result of the determination in step 156 is negative, the second control section 92 proceeds to step 166.

In step 166, the second control section 92 makes a determination as to whether the parking of the vehicle 76 has ended on the basis of whether or not the ignition switch of the vehicle 76 has been turned on. When the result of the determination in step 166 is negative, the second control section 92 returns to step 154 and repeats the processing from step 154. Thus, when the results of the determinations in steps 154 and 156 are both negative, the side mirrors 78 are maintained at the closed positions.

Figure 10:
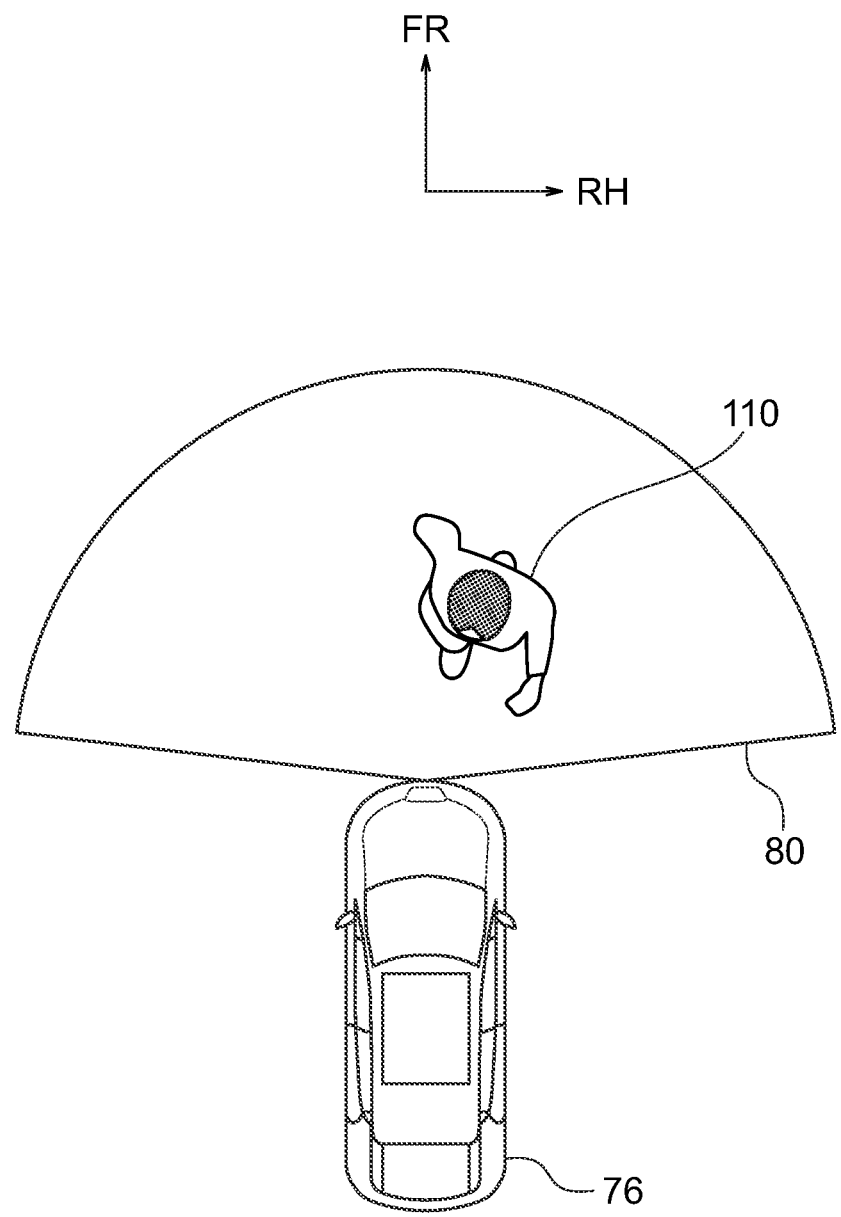
FIG. 10 is a conceptual diagram showing a situation in which a nearby object is detected in an imaging range of a front camera.

As an example, FIG. 10 shows a situation in which a nearby object 110 is detected in the imaging range 80 of the front camera 34 of the imaging section 33. In this kind of situation, the result of the determination in step 154 is affirmative and the second control section 92 proceeds to step 160. In step 160, the second control section 92 acquires nearby object detection results based on images captured by the imaging section 33 from the first control section 90, and the second control section 92 makes a determination as to whether a movement of the nearby object to leave the imaging range of the imaging section 33 in the state in which the side mirrors 78 are disposed at the closed positions is detected. When the result of the determination in step 160 is negative, the second control section 92 proceeds to step 162. When the result of the determination in step 154 is affirmative and the result of the determination in step 160 is negative, the side mirrors 78 are maintained at the closed positions.

Figure 11:
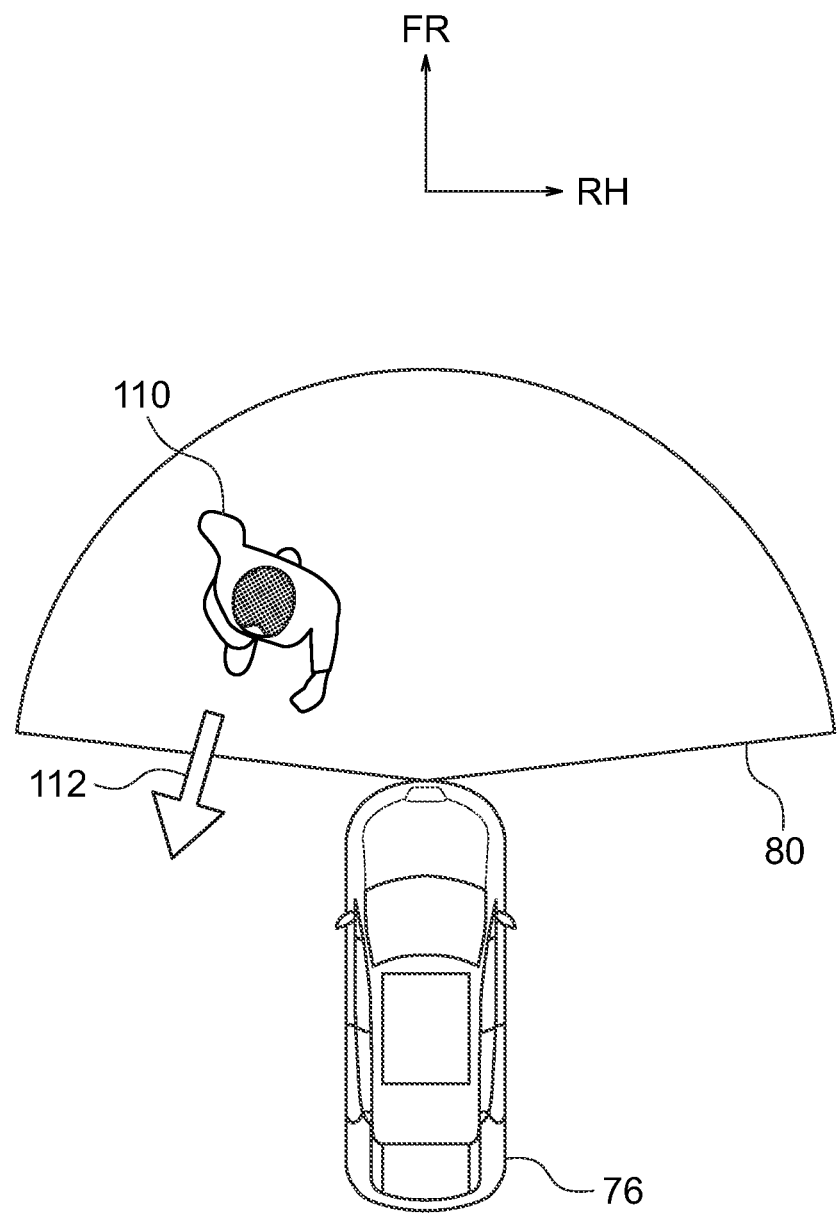
FIG. 11 is a conceptual diagram showing a situation in which a vector of a nearby object is directed in a direction of leaving the imaging range of the front camera.

As another example, FIG. 11 shows a situation in which a vector 112 of the nearby object 110 detected in the imaging range 80 of the front camera 34 is directed in a direction to leave the imaging range 80 of the front camera 34. In this kind of situation, the result of the determination in step 160 is affirmative and the second control section 92 proceeds from step 160 to step 158. When the result of the determination in step 160 is affirmative, the processing proceeds from step 160 to step 158. In step 158, the second control section 92 acquires the current position of each side mirror 78. If the side mirror 78 is disposed at the closed position, the second control section 92, via the first control section 90 of the periphery monitoring ECU 22, causes the mirror opening-and-closing actuator 42 to rotate the side mirror 78 to the open position. Thus, the side mirror 78 is put into a state in which a nearby object entering the image capture deficiency range 88 may be imaged by the side camera 36 or side camera 38.

In step 162, the second control section 92 acquires, from the first control section 90, nearby object detection results based on images captured by the imaging section 33 or nearby object detection results based on detection results according to the clearance sonar 44. The second control section 92 then makes a determination on the basis of the information acquired from the first control section 90 as to whether the nearby object has moved away from the vehicle 76 to beyond a detection distance of the imaging section 33. A time at which the result of the determination in step 162 is affirmative may be, for example, a time at which a nearby object has moved away to at least a certain distance from the vehicle 76. This time may also be, for example, a time at which a nearby object is detected by the imaging section 33 or the clearance sonar 44 as having departed from the image capture deficiency range 88.

When the result of the determination in step 162 is affirmative, the second control section 92 proceeds to step 164. In step 164, the second control section 92 acquires the current position of each side mirror 78, and if the side mirror 78 is disposed at the open position, the second control section 92, via the first control section 90 of the periphery monitoring ECU 22, causes the mirror opening-and-closing actuator 42 to rotate the side mirror 78 to the closed position. When the result of the determination in step 162 is negative, the second control section 92 proceeds to step 166 without causing the side mirrors 78 to rotate.

Figure 12:
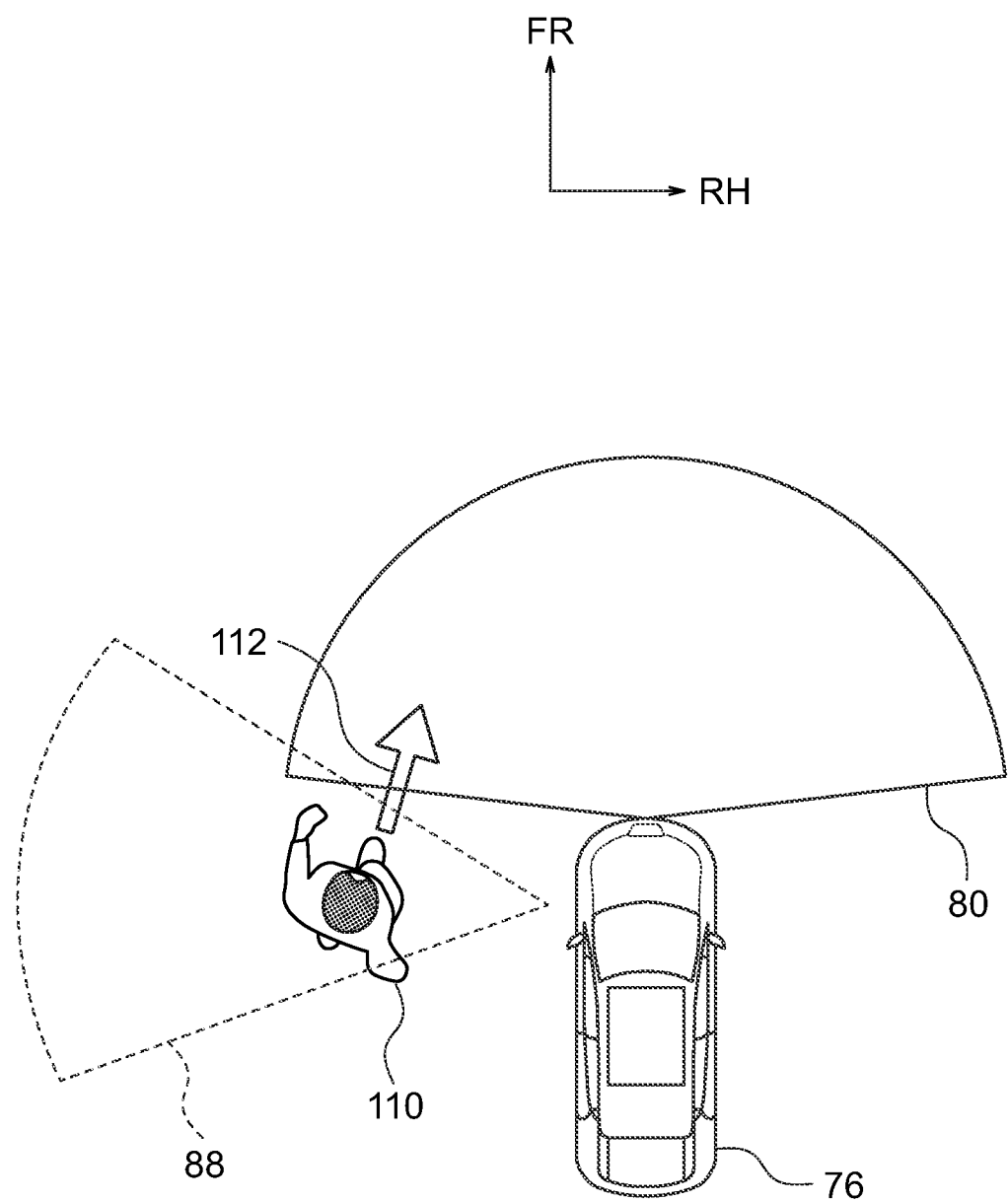
FIG. 12 is a conceptual diagram showing a situation in which a vector of a nearby object located in an image capture deficiency range is directed into the imaging range of the front camera.

As an example, FIG. 12 shows a situation in which the vector 112 of the nearby object 110 located in the image capture deficiency range 88 is directed toward the imaging range 80 of the front camera 34. This is a state in which each side mirror 78 has already been rotated to the open position. Subsequently, when the result of the determination in step 162 is affirmative, the side mirror 78 is rotated to the closed position.

When parking of the vehicle 76 has ended, the result of the determination in step 166 is affirmative and the second control section 92 proceeds to step 168. In step 168, the second control section 92, via the first control section 90 of the periphery monitoring ECU 22, causes the mirror opening-and-closing actuators 42 to rotate the side mirrors 78 to the open positions. Then, in step 170, the second control section 92 commands the data storage ECU 70 to end the parked interval video image recording. Accordingly, the data storage ECU 70 ends the processing to acquire images (moving images) captured by the imaging section 33 via the communication line 102 and record the acquired images as parked interval driving recorder images.

Figure 13:
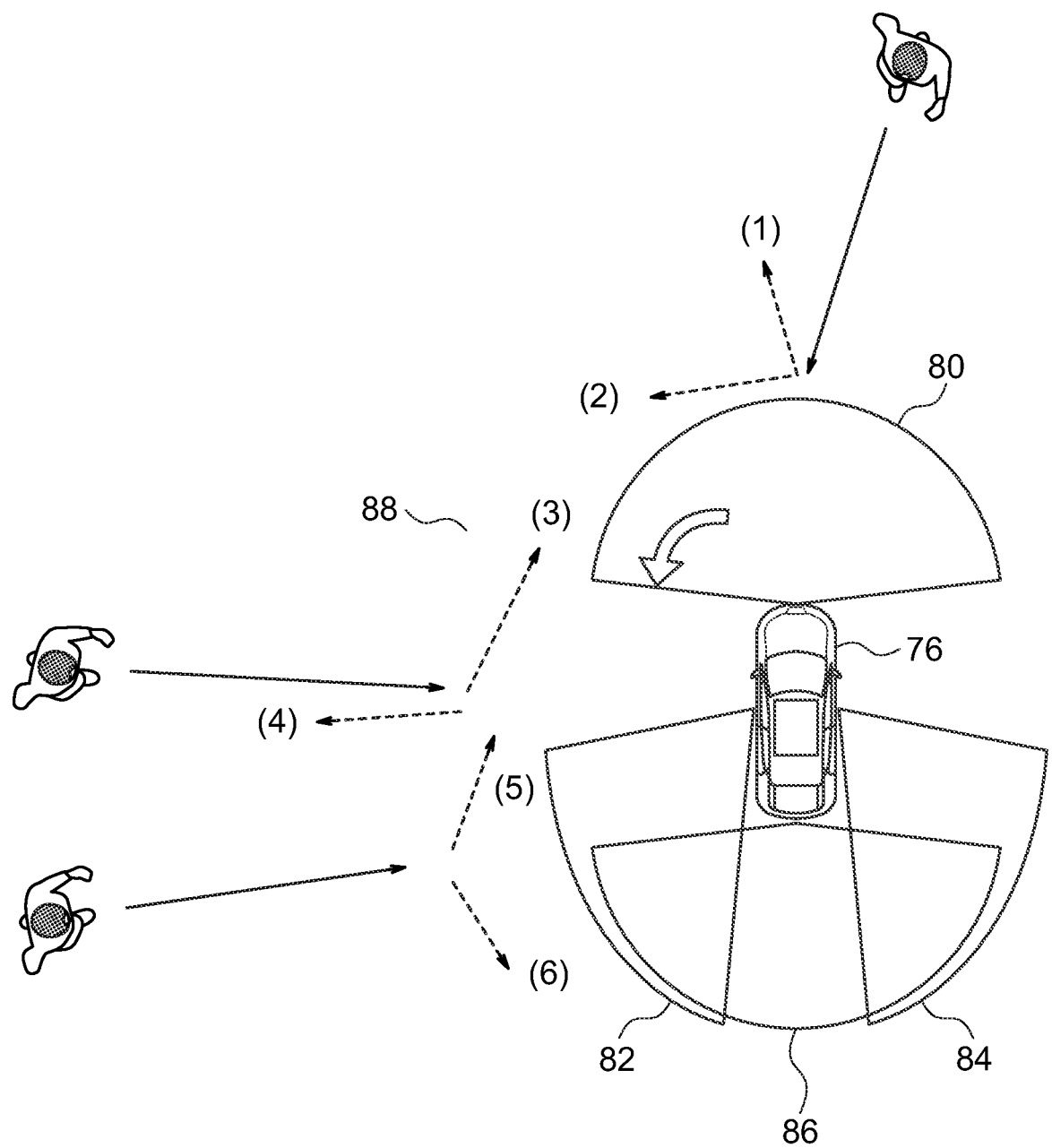
FIG. 13 is a conceptual diagram showing examples of movements of nearby objects.

Now, the parked interval processing is described further, giving specific examples of movements of objects with reference to FIG. 13. As an example, a situation is considered in which, as denoted by the symbol (1) in FIG. 13, an object approaches the vehicle 76 from in front of the vehicle 76 and then moves away from the vehicle 76 to the front of the vehicle 76 within the imaging range 80 of the front camera 34. In this situation, the object is detected as a nearby object on the basis of images captured by the imaging section 33. The result of the determination in step 154 is affirmative, but the result of the determination in step 160 is negative. Therefore, each side mirror 78 is kept at the closed position. In this situation, the number of times the side mirrors 78 are opened and closed may be reduced.

As another example, a situation is considered in which, as denoted by the symbol (2) in FIG. 13, an object approaches the vehicle 76 from in front of the vehicle 76 and then moves away from the vehicle 76 to the side of the vehicle 76. In this situation, the object is detected as a nearby object on the basis of images captured by the imaging section 33 and the result of the determination in step 154 is affirmative. When movement of the nearby object to leave the imaging range of the imaging section 33 is detected, the result of the determination in step 160 is affirmative and each side mirror 78 is rotated to the open position. In this situation, a case of the nearby object leaving the imaging range of the imaging section 33 may be prevented and the nearby object may continue to be a subject of imaging.

As another example, a situation is considered in which, as denoted by the symbol (3) in FIG. 13, an object approaches the vehicle 76 from the side of the front of the vehicle 76 and then moves away from the vehicle 76 to the front of the vehicle 76. In this situation, the object is not detected as a nearby object on the basis of images captured by the imaging section 33, and the result of the determination in step 154 is negative. However, the object is detected as a nearby object from detection results according to the clearance sonar 44, the result of the determination in step 156 is affirmative, and each side mirror 78 is rotated to the open position. In this situation, a case of the nearby object leaving the imaging range of the imaging section 33 may be prevented and the nearby object may continue to be a subject of imaging. Subsequently, when the nearby object moves away from the vehicle 76 to outside the imaging range of the imaging section 33, the result of the determination in step 162 is affirmative and the side mirror 78 is rotated to the closed position.

As another example, a situation is considered in which, as denoted by the symbol (4) in FIG. 13, an object approaches the vehicle 76 from the side of the front of the vehicle 76 and then moves away from the vehicle 76 to the side of the vehicle 76. In this situation, the object is not detected as a nearby object on the basis of images captured by the imaging section 33, and the result of the determination in step 154 is negative. However, the object is detected as a nearby object from detection results according to the clearance sonar 44, the result of the determination in step 156 is affirmative, and each side mirror 78 is rotated to the open position. In this situation, a case of the nearby object leaving the imaging range of the imaging section 33 may be prevented and the nearby object may continue to be a subject of imaging.

As another example, a situation is considered in which, as denoted by the symbol (5) in FIG. 13, an object approaches the vehicle 76 from the rear of the vehicle 76 and subsequently moves away from the vehicle 76 to the side of the front of the vehicle 76. In this situation, the object is detected as a nearby object on the basis of images captured by the imaging section 33 and the result of the determination in step 154 is affirmative. Then, movement of the nearby object to leave the imaging range of the imaging section 33 is detected, the result of the determination in step 160 is affirmative, and each side mirror 78 is rotated to the open position. In this situation, a case of the nearby object leaving the imaging range of the imaging section 33 may be prevented and the nearby object may continue to be a subject of imaging.

As another example, a situation is considered in which, as denoted by the symbol (6) in FIG. 13, an object approaches the vehicle 76 from the rear of the vehicle 76 and then moves away from the vehicle 76 to the rear of the vehicle 76. In this situation, the object is detected as a nearby object on the basis of images captured by the imaging section 33 and the result of the determination in step 154 is affirmative. However, movement of the nearby object to leave the imaging range of the imaging section 33 is not detected, the result of the determination in step 160 is negative, and each side mirror 78 is kept at the closed position. In this situation, the number of times the side mirrors 78 are opened and closed may be reduced.

As described above, in the present exemplary embodiment, the in-vehicle driving recorder system includes the imaging section 33, the clearance sonar 44, the data storage ECU 70, the first control section 90 of the periphery monitoring ECU 22, and the second control section 92 of the mirror opening-and-closing ECU 46. The imaging section 33 includes the left and right side cameras 36 and 38 mounted at the side mirrors 78, which are provided at the left and right of the vehicle 76 and are rotatable between the open positions and the closed positions. In a state in which each side mirror 78 is disposed at the open position, the optical axis of the side camera 36 or 38 is angled outward from the vehicle 76 relative to the vertical direction. The imaging section 33 also includes the front camera 34 that images to the front of the vehicle 76 and the rear camera 40 that images to the rear of the vehicle 76. The clearance sonar 44, by transmitting probing waves and receiving reception waves including reflections of the probing waves, detects objects that are present in the surroundings of the vehicle 76. The data storage ECU 70 records images captured by the imaging section 33. When a predetermined condition is satisfied on the basis of at least one of detection results from the imaging section 33 and detection results from the clearance sonar 44, the first control section 90 and second control section 92 cause each side mirror 78 to rotate from the closed position to the open position. The predetermined condition is that a nearby object proximate to the vehicle 76 is determined to be entering the image capture deficiency range 88 of the periphery of the vehicle 76, which range cannot be imaged by the imaging section 33 in the state in which the side mirror 78 is disposed at the closed position. Thus, in a structure in which the side camera mounted at each side mirror 78 is angled to the vehicle 76 outer side from the vertical direction, a nearby object that is proximate to the vehicle 76 may be imaged even when the side mirror 78 has been disposed at the closed position. In addition, a number of times the side mirror 78 is rotated may be reduced and energy consumption may be reduced.

In the present exemplary embodiment, in the state in which each side mirror 78 is disposed at the closed position, the second control section 92 determines that a nearby object is entering the image capture deficiency range 88 in a situation in which the nearby object is not located in the imaging range according to the imaging section 33 but the nearby object is located in the detection range according to the clearance sonar 44. Therefore, when a nearby object is not located in the imaging range according to the imaging section 33, a determination as to whether the nearby object is entering the image capture deficiency range 88 may be implemented by simple processing.

In the present exemplary embodiment, in the state in which each side mirror 78 is disposed at the closed position, the second control section 92 determines that a nearby object is entering the image capture deficiency range 88 in a situation in which the nearby object is located in the imaging range according to the imaging section 33 but a movement of the nearby object to leave the imaging range is detected. Therefore, when a nearby object is located in the imaging range according to the imaging section 33, a determination as to whether the nearby object is entering the image capture deficiency range 88 may be implemented by simple processing.

In the present exemplary embodiment, in the state in which each side mirror 78 is disposed at the closed position, the second control section 92 maintains the side mirror 78 in the state disposed at the closed position in a situation in which a nearby object is located in the imaging range according to the imaging section 33 and no movement of the nearby object to leave the imaging range is detected. Therefore, a number of times the side mirror 78 is rotated may be reduced and energy consumption may be reduced.

In the present exemplary embodiment, in the state in which each side mirror 78 is disposed at the closed position, the second control section 92 maintains the side mirror 78 in the state disposed at the closed position in a situation in which no nearby object is located in the imaging range according to the imaging section 33 and no nearby object is located in the detection range according to the clearance sonar 44. Therefore, a number of times the side mirror 78 is rotated may be reduced and energy consumption may be reduced.

In the present exemplary embodiment, in a situation in which each side mirror 78 is rotated from the closed position to the open position and subsequently the second control section 92 detects that the nearby object has moved away from the vehicle 76 and departed to outside the imaging range according to the imaging section 33, the second control section 92 rotates the side mirror 78 from the open position to the closed position. Thus, the side mirror 78 may be returned to the closed position when a nearby object departs outside the imaging range according to the imaging section 33.

In the present exemplary embodiment, the detection range of the clearance sonar 44 is a range that encompasses the image capture deficiency range 88. Therefore, even when a nearby object approaches the vehicle 76 from a direction in the image capture deficiency range 88, the nearby object may be detected by the clearance sonar 44.

The parked interval processing shown in FIG. 9 is described in the present exemplary embodiment, but the present disclosure is not limited by the processing shown in FIG. 9. For example, in a state in which a nearby object is disposed in the imaging range 80 according to the front camera 34, monitoring is conducted for the nearby object entering an overlap region between the imaging range 80 and the imaging range 82 according to the side camera 36 or the imaging range 84 according to the side camera 38. When the nearby object enters an overlap region, the second control section 92 starts preparation to rotate the side mirror 78 to the open position. Therefore, when the nearby object leaves the imaging range 80 and enters the imaging range 82 or the imaging range 84, the side mirror 78 may be rotated to the open position immediately and the nearby object may be imaged immediately by the side camera 36 or the side camera 38.

Further, in step 158 of the parked interval processing shown in FIG. 9, instead of the side mirror 78 simply being rotated to the open position, a rotation angle of the side mirror 78 toward the open position may be controlled on the basis of distance information from the object located in the surroundings. For example, when the distance from the object located in the surroundings is small, the side mirror 78 may be opened to a maximum extent within a range that does not result in contact with the object.

In the descriptions above, a mode is described in which the clearance sonar 44 is employed as an example of a detector of the present disclosure, but the present disclosure is not limited thus. For example, millimeter wave radar or the like may be employed as the detector.

In the descriptions above, it is presumed that the left and right side mirrors 78 are rotated in the same manner, but this is not limiting. The left and right side mirrors 78 may be rotated independently.

In the descriptions above, a mode is described in which the first control section 90 and second control section 92 co-operate to function as the control section of the present disclosure, but the present disclosure is not limited thus. A single control section realized by a single ECU may function as the control section of the present disclosure.

In the descriptions above, a mode is described in which the control program 32 causing the periphery monitoring ECU 22 to function as the first control section 90 is memorized in advance at the memory section 28 and the parked interval program 56 causing the periphery monitoring ECU 22 to function as the second control section 92 is memorized in advance at the memory section 52. However, these programs may be provided in a mode of being recorded at a non-transient recording medium such as an HDD, SSD, DVD or the like.

What is claimed is:

1. An in-vehicle driving recorder system comprising:
    an imaging section that includes
        left and right side cameras mounted at side mirrors that are provided at each of left and right of a vehicle, each side mirror being rotatable between an open position and a closed position, and an optical axis of each side camera being angled outward from the vehicle relative to the vertical direction in a state in which the side mirror is disposed at the open position,
        a front camera that images to the front of the vehicle, and
        a rear camera that images to the rear of the vehicle;
    a detector that transmits a probing wave, receives a reception wave including a reflection of the probing wave, and detects an object located in surroundings of the vehicle;
    a recording section that records images imaged by the imaging section; and
    a controller that causes the each side mirror to rotate from the closed position toward the open position when the controller determines that a nearby object proximate to the vehicle is entering an image capture deficiency range of a periphery of the vehicle, the imaging section being incapable of imaging the image capture deficiency range in the state in which the side mirror is disposed at the closed position, and the controller making the determination on the basis of at least one of imaging results from the imaging section and detection results from the detector.

2. The in-vehicle driving recorder system according to claim 1 wherein, in the state in which the side mirror is disposed at the closed position, the controller determines that the nearby object is entering the image capture deficiency range when the nearby object is not located in an imaging range according to the imaging section but the nearby object is located in a detection range according to the detector.

3. The in-vehicle driving recorder system according to claim 1 wherein, in the state in which the side mirror is disposed at the closed position, the controller determines that the nearby object is entering the image capture deficiency range when the nearby object is located in an imaging range according to the imaging section and the controller detects a movement of the nearby object to leave the imaging range.

4. The in-vehicle driving recorder system according to claim 2 wherein, in the state in which the side mirror is disposed at the closed position, the controller determines that the nearby object is entering the image capture deficiency range when the nearby object is located in an imaging range according to the imaging section and the controller detects a movement of the nearby object to leave the imaging range.

5. The in-vehicle driving recorder system according to claim 3 wherein, in the state in which the side mirror is disposed at the closed position, the controller maintains the state in which the side mirror is disposed at the closed position when the nearby object is located in the imaging range according to the imaging section and the controller does not detect a movement of the nearby object to leave the imaging range.

6. The in-vehicle driving recorder system according to claim 4 wherein, in the state in which the side mirror is disposed at the closed position, the controller maintains the state in which the side mirror is disposed at the closed position when the nearby object is located in the imaging range according to the imaging section and the controller does not detect a movement of the nearby object to leave the imaging range.

7. The in-vehicle driving recorder system according to claim 1 wherein, in the state in which the side mirror is disposed at the closed position, the controller maintains the state in which the side mirror is disposed at the closed position when the nearby object is not located in an imaging range according to the imaging section and the nearby object is not located in a detection range according to the detector.

8. The in-vehicle driving recorder system according to claim 2 wherein, in the state in which the side mirror is disposed at the closed position, the controller maintains the state in which the side mirror is disposed at the closed position when the nearby object is not located in an imaging range according to the imaging section and the nearby object is not located in a detection range according to the detector.

9. The in-vehicle driving recorder system according to claim 3 wherein, in the state in which the side mirror is disposed at the closed position, the controller maintains the state in which the side mirror is disposed at the closed position when the nearby object is not located in an imaging range according to the imaging section and the nearby object is not located in a detection range according to the detector.

10. The in-vehicle driving recorder system according to claim 5 wherein, in the state in which the side mirror is disposed at the closed position, the controller maintains the state in which the side mirror is disposed at the closed position when the nearby object is not located in an imaging range according to the imaging section and the nearby object is not located in a detection range according to the detector.

11. The in-vehicle driving recorder system according to claim 1 wherein, when the side mirror has been rotated from the closed position to the open position and subsequently the controller detects that the nearby object is moving away from the vehicle and departing to outside an imaging range according to the imaging section, the controller causes the side mirror to rotate from the open position to the closed position.

12. The in-vehicle driving recorder system according to claim 2 wherein, when the side mirror has been rotated from the closed position to the open position and subsequently the controller detects that the nearby object is moving away from the vehicle and departing to outside an imaging range according to the imaging section, the controller causes the side mirror to rotate from the open position to the closed position.

13. The in-vehicle driving recorder system according to claim 3 wherein, when the side mirror has been rotated from the closed position to the open position and subsequently the controller detects that the nearby object is moving away from the vehicle and departing to outside an imaging range according to the imaging section, the controller causes the side mirror to rotate from the open position to the closed position.

14. The in-vehicle driving recorder system according to claim 5 wherein, when the side mirror has been rotated from the closed position to the open position and subsequently the controller detects that the nearby object is moving away from the vehicle and departing to outside an imaging range according to the imaging section, the controller causes the side mirror to rotate from the open position to the closed position.

15. The in-vehicle driving recorder system according to claim 1, wherein a detection range of the detector is a range that encompasses the image capture deficiency range.

16. The in-vehicle driving recorder system according to claim 2, wherein a detection range of the detector is a range that encompasses the image capture deficiency range.

17. The in-vehicle driving recorder system according to claim 3, wherein a detection range of the detector is a range that encompasses the image capture deficiency range.

18. The in-vehicle driving recorder system according to claim 5, wherein a detection range of the detector is a range that encompasses the image capture deficiency range.

* * * * *